United States Patent
Yan et al.

(10) Patent No.: US 9,843,866 B2
(45) Date of Patent: Dec. 12, 2017

(54) PIEZOELECTRIC BONE CONDUCTION RECEIVER AND PORTABLE ELECTRONIC DEVICE

(71) Applicants: GUANG DONG OPPO MOBILE TELECOMMUNICATIONS CORP., LTD, Dongguan (CN); KINGTONE INNOVATION (BEIJING) TECHNOLOGY CO., LTD, Beijing (CN)

(72) Inventors: Bixiang Yan, Dongguan (CN); Shiming Yuan, Dongguan (CN)

(73) Assignees: GUANG DONG OPPO MOBILE TELECOMMUNICATIONS CORP., LTD, Dongguan (CN); KINGTONE INNOVATION (BEIJING) TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 15/010,401

(22) Filed: Jan. 29, 2016

(65) Prior Publication Data
US 2016/0150323 A1  May 26, 2016

Related U.S. Application Data

(63) Continuation of application No. PCT/CN2014/079157, filed on Jun. 4, 2014.

(30) Foreign Application Priority Data

Aug. 1, 2013 (CN) .......................... 2013 1 0332713

(51) Int. Cl.
*H02B 1/00* (2006.01)
*H04R 17/00* (2006.01)
(Continued)

(52) U.S. Cl.
CPC .............. *H04R 17/00* (2013.01); *H04M 1/03* (2013.01); *H04R 3/12* (2013.01); *H04R 2460/13* (2013.01); *H04R 2499/11* (2013.01)

(58) Field of Classification Search
CPC ...... H04R 17/00; H04R 3/12; H04R 2460/13; H04R 2499/11; H04R 1/02; H04R 1/025;
(Continued)

(56) References Cited

U.S. PATENT DOCUMENTS 6,628,790 B1 * 9/2003 Klein ..................... H04R 1/225
                                                                181/160
2010/0310084 A1   12/2010 Hersbach
2012/0289162 A1 * 11/2012 Hosoi .................. H04R 25/606
                                                                455/41.3

FOREIGN PATENT DOCUMENTS

CN          1402953        3/2003
CN          103002388      3/2013
(Continued)

*Primary Examiner* — Leshui Zhang
(74) *Attorney, Agent, or Firm* — Harness, Dickey & Pierce, P.L.C.

(57) ABSTRACT

A piezoelectric bone conduction receiver and a portable electronic device are disclosed. The piezoelectric bone conduction receiver comprises: a piezoelectric bone conduction receiver driving unit functioning as an acoustic vibration element, a piezoelectric driving and signal processing circuit connected with the piezoelectric bone conduction receiver driving unit, and a driving signal switching module, wherein the piezoelectric bone conduction receiver driving unit comprises at least two piezoelectric bone conduction receiver driving modules which can be independently driven in operation, the at least two piezoelectric bone conduction receiver driving modules are connected to the driving signal switching module which is connected with the piezoelectric driving and signal processing circuit, and the driving signal switching module is configured to control phases of piezo-
(Continued)

electric driving signals output by the piezoelectric driving and signal processing circuit to the piezoelectric bone conduction receiver driving modules, so that the phases of the piezoelectric driving signals received by the piezoelectric bone conduction receiver driving modules are same or opposite.

14 Claims, 4 Drawing Sheets

(51) Int. Cl.
*H04M 1/03* (2006.01)
*H04R 3/12* (2006.01)

(58) Field of Classification Search
CPC .......... H04R 1/026; H04R 1/26; H04R 1/028; H04R 1/1041; H04R 1/403; H04R 2225/61; H04R 1/227; H04R 9/06; H04R 5/02; H04R 2201/023; H04R 2201/401; H04R 2201/403; H04R 2205/021; H04R 2205/022; H04R 2420/07; H04R 27/00; H04M 1/03; H04M 1/02; H04M 1/2155; H04M 1/6033; H04M 1/6041; H04M 1/62; H02B 1/00; G10K 11/025
USPC ... 381/123, 87, 89, 332, 333, 334, 335, 336, 381/111, 116, 117, 151, 345, 351, 374, 381/384, 385, 386, 388, 190, 191, 70, 381/71.1–71.14, 312–314, 316–321, 61, 381/66, 72, 73.1, 74, 79, 80, 81, 82, 83, 381/85, 94.1, 94.2, 94.3, 94.5, 94.6, 94.7, 381/94.8, 94.9, 97, 98, 99, 100, 101, 102, 381/103; 700/94; 455/569.1, 149, 350, 455/456.4, 575.2, 575.3, 575.4, 569.2, 455/570; 379/420.01, 420.02
See application file for complete search history.

(56) References Cited

FOREIGN PATENT DOCUMENTS

| CN | 103369440 | 10/2013 |
|---|---|---|
| CN | 203368744 | 12/2013 |

* cited by examiner

PIEZOELECTRIC BONE CONDUCTION RECEIVER AND PORTABLE ELECTRONIC DEVICE

CROSS-REFERENCE TO RELATED APPLICATIONS

This application is a continuation of PCT Application No. PCT/CN2014/079157 filed Jun. 4, 2014, which claims priority to Chinese Patent Application No. 201310332713.3 filed Aug. 1, 2013. The entire disclosures of the above applications are incorporated herein by reference.

FIELD

The present disclosure relates to receivers, in particular to a piezoelectric bone conduction receiver and a portable electronic device.

BACKGROUND

This section provides background information related to the present disclosure which is not necessarily prior art.

With the popularity of smart phones, increasingly enlarged display panels are presently applied in the smart phones, and the smart phones have become increasingly thinner. Due to its complicated structure, the traditional moving coil receiver (i.e. telephone receiver) is hard to reduce in size and thickness. Furthermore, the traditional moving coil receiver includes a vibrating membrane which can cause the air to vibrate to generate sound waves, and the traditional moving coil receiver is required to be provided with an opening for air vibration conduction, thereby causing an inconsistent appearance of the moving coil receiver and raising the risk of dust or moisture permeation.

The local sound pressure level in an air-conduction receiver is generally ranged from 90 dB to 100 dB in operation, and the sound pressure level is lowered to a range of 50 dB to 60 dB at a distance of one meter away from the air-conduction receiver in a quiet environment (such as in an office space with a noise level of 50 dB), whereby telephone conversations can be easily perceived by the people around to cause privacy leakage.

Piezoelectric materials are special substances with a unique property. When piezoelectric crystals or piezoelectric materials are deformed by an applied external force, electrical charges which are variable depending upon the state of the applied external force are accumulated on outer surfaces of the piezoelectric crystals or the piezoelectric materials, thereby causing the piezoelectric crystals or the piezoelectric materials to exhibit the direct piezoelectric effect. When an external electric field is applied to piezoelectric crystals or piezoelectric materials, the piezoelectric crystals or the piezoelectric materials are mechanically deformed, and an amount of the deformation is variable depending upon the state of an intensity of the applied electric field, thereby causing the piezoelectric crystals or the piezoelectric materials to exhibit the reverse piezoelectric effect. With the above-mentioned unique property, the piezoelectric materials have been applied in the speaker and the touch panel.

Acoustic vibration may be transferred to the auditory nerve in two manners, i.e. an air-conduction manner which is almost dominant in acoustic vibration propagation and a bone conduction manner which is generally negligible for forming a hearing. The bone conduction manner, in which the sound waves are transferred into the inner ear via skull rather than via the external auditory canal and the eardrum, includes a translatory mode of bone conduction and a compressional mode of bone conduction, and a synergistic action between the translatory mode of bone conduction and the compressional mode of bone conduction can stimulate the Corti's organ to form a hearing.

A conduction path of the bone conduction manner is described as follows:

The sound waves-skull-bony labyrinths-inner ear lymphs-Corti's organ-the auditory nerve-the brain auditory Hub.

The currently available bone conduction device usually contacts with at least one of various body parts such as the teeth, the shoulder, the otica, the afterbrain and the mastoid process in use.

A piezoelectric transducer includes, as an acoustic vibration generating element, a piezoelectric bimorph or unimorph element. The piezoelectric bimorph or unimorph element includes a metal plate and a piezoelectric plate adhered to the metal plate. As mechanical vibration is variable depending upon the state of a piezoelectric deformation caused by voltage rather than current, the piezoelectric transducer is not accompanied with dissipation of Joule heat by the coil in the electromechanical transducer of the electromagnetic type. In addition, due to the absence of the magnet and the magnetic conductive bowl, the piezoelectric transducer becomes small in size and light in weight.

In Chinese Patent Application Publication No. CN1627864A (which was filed on Dec. 1, 2004, in the name of NEC TOKIN CORPORATION (JP), and relates to a piezoelectric device), a piezoelectric bone conduction speaker is described, wherein a piezoelectric unimorph element functioning as an acoustic vibration element includes a metal plate and a piezoelectric ceramic plate adhered to the metal plate, and a flexible silicone material is coated on an outer surface of the piezoelectric unimorph element to improve the frequency response performance of the piezoelectric unimorph element.

The piezoelectric bone conduction device as described In Chinese Patent Application Publication No. CN1627864A has a relatively high impedance characteristic and a relatively high resonance frequency characteristic, and requires a relatively high input driving voltage, so that sound reproduction in the low-frequency region lower than the resonance frequency is insufficient. Moreover, generation of vibration at a specific frequency is likely to be enhanced or weakened due to a high mechanical quality factor of the vibration system, thus sound reproduction cannot naturally and normally be carried out.

SUMMARY

This section provides a general summary of the disclosure, and is not a comprehensive disclosure of its full scope or all of its features.

The present disclosure provides a piezoelectric bone conduction receiver supporting a private voice call mode and a portable electronic device.

To this end, the following technical solutions are provided.

A piezoelectric bone conduction receiver, including: a piezoelectric bone conduction receiver driving unit functioning as an acoustic vibration element, and a piezoelectric driving and signal processing circuit connected with the piezoelectric bone conduction receiver driving unit, wherein the piezoelectric bone conduction receiver further includes a driving signal switching module, the piezoelectric bone conduction receiver driving unit includes at least two piezoelectric bone conduction receiver driving modules which can be driven independently in operation, the at least two piezoelectric bone conduction receiver driving modules are connected with the driving signal switching module, which is further connected with the piezoelectric driving and signal processing circuit, and the driving signal switching module is configured to control phases of piezoelectric driving signals outputted by the piezoelectric driving and signal processing circuit to the at least two piezoelectric bone conduction receiver driving modules, so that the phases of the piezoelectric driving signals received by the piezoelectric bone conduction receiver driving modules are same or opposite.

In some embodiments, the driving signal switching module is an analog switch.

The piezoelectric bone conduction receiver driving unit includes a first piezoelectric bone conduction receiver driving module and a second piezoelectric bone conduction receiver driving module driven independently from the first piezoelectric bone conduction receiver driving module, and wherein a positive signal input terminal and a negative signal input terminal of each of the first piezoelectric bone conduction receiver driving module and the second piezoelectric bone conduction receiver driving module are connected with the analog switch, and the analog switch is configured to switch the phases of the piezoelectric driving signals received by the first and second piezoelectric bone conduction receiver driving modules between a first relationship, in which the positive signal input terminal and the negative signal input terminal of the first piezoelectric bone conduction receiver driving module are respectively connected with the positive signal input terminal and the negative signal input terminal of the second piezoelectric bone conduction receiver driving module, and a second relationship, in which the positive signal input terminal and the negative signal input terminal of the first piezoelectric bone conduction receiver driving module are respectively connected with the negative signal input terminal and the positive signal input terminal of the second piezoelectric bone conduction receiver driving module.

The at least two piezoelectric bone conduction receiver driving modules each include: a piezoelectric material coated with an upper electrode layer and a lower electrode layer at opposite sides thereof, a circuit board, and a thin or flexible circuit configured to connect the upper and lower electrode layers with the circuit board.

The piezoelectric material of the piezoelectric bone conduction receiver driving module is selected from a piezoelectric ceramic material or a piezoelectric organic polymer material.

The piezoelectric material forms a single-layer structure, a double-layer composite structure or a multi-layer composite structure.

The flexible circuit is a silver conductive adhesive, lead wires, a Flexible Printed Circuit (FPC) or a flexible conductive strip, and a contact resistance of the flexible circuit is less than 5Ω.

A portable electronic device includes any of the previous piezoelectric bone conduction receivers.

In some embodiments, the piezoelectric bone conduction receiver driving modules can be disposed under a bottom surface of a display screen or a glass protective screen cover of the portable electronic device.

As such, the piezoelectric bone conduction receiver of the present disclosure includes the driving signal switching module, which is configured to control phases of the driving signals applied to the two piezoelectric bone conduction receiver driving modules, so that the phases of the driving signals are same in a noisy environment to increase the volume loudness, in this case, some vibration from the piezoelectric bone conduction receiver is perceived by the user through conduction via body bones, and some other vibration from the piezoelectric bone conduction receiver is conducted by means of air coupling and is perceived by the user through the traditional double-path air acoustic coupling; otherwise in a quiet environment, the driving signal switching module controls the phases of the driving signals to be opposite to each other, so that the voice over the telephone call is basically perceived by the user through the vibration transferred via bone conduction, but the vibration transferred via air coupling is substantially counteracted due to the opposite phases of the vibration sources, with merely an insignificant amount of the vibration in middle and high frequency regions which is attenuated as a function of 1/R in the local area from the piezoelectric bone conduction receiver. Therefore, conversations over the telephone call can be prevented from being perceived by the people around, thereby achieving high privacy of the telephone call compared with the related art.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
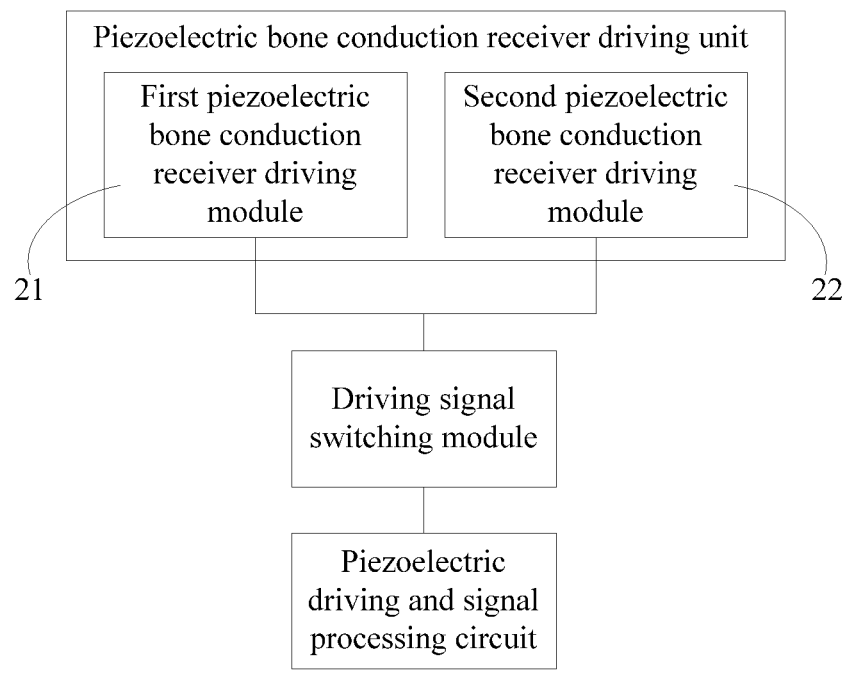
FIG. 1 is a circuit block diagram of a piezoelectric bone conduction receiver according to a specific embodiment of the present disclosure.

As shown in FIG. 1, a piezoelectric bone conduction receiver includes: a piezoelectric bone conduction receiver driving unit functioning as an acoustic vibration element, a piezoelectric driving and signal processing circuit connected with the piezoelectric bone conduction receiver driving unit, and a driving signal switching module.

The piezoelectric bone conduction receiver driving unit includes at least two piezoelectric bone conduction receiver driving modules which can be independently driven in operation. In the present embodiment, the piezoelectric bone conduction receiver driving unit includes a first piezoelectric bone conduction receiver driving module 21 and a second piezoelectric bone conduction receiver driving module 22.

Each of the first and second piezoelectric bone conduction receiver driving modules is connected with the driving signal switching module. The driving signal switching module is further connected with the piezoelectric driving and signal processing circuit.

The driving signal switching module is configured to selectively adjust a phase relationship between driving signals respectively applied to the first and second piezoelectric bone conduction receiver driving modules, so that the first and second piezoelectric bone conduction receiver driving modules are simultaneously driven by the driving signals of the same phase or opposite phases.

Figure 2:
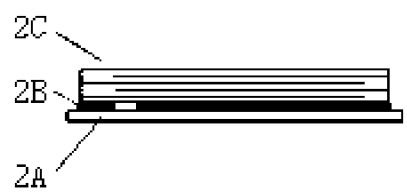
FIG. 2 is a schematic view of a driving module of the piezoelectric bone conduction receiver shown in FIG. 1.

As shown in FIG. 2, the first piezoelectric bone conduction receiver driving module 21 and the second piezoelectric bone conduction receiver driving module 22 both include: a piezoelectric material 2C coated with an upper electrode layer and a lower electrode layer, a circuit board 2A, and a thin or flexible circuit 2B interconnecting the upper and lower electrode layers with the circuit board, wherein the thin or flexible circuit 2B has a contact resistance preferably less than 5 ohms ($\Omega$). The piezoelectric material 2C may be made of a piezoelectric ceramic material (such as PbZrxTi$_{1-x}$O$_3$ (PZT) piezoelectric ceramic) or a piezoelectric organic polymer material (such as polyvinylidene fluoride (PVDF)), and the piezoelectric material 2C may form a single-layer structure, a double-layer composite structure or a multi-layer composite structure. A piezoelectric ceramic having a multi-layer composite structure can significantly decrease the threshold voltage thereof compared with that of a piezoelectric ceramic having a single-layer structure, for example, a piezoelectric ceramic of a multi-layer composite structure having a thickness of 0.1 mm, which is constructed by stacking five individual PZT piezoelectric ceramic layers each having a thickness of 20 μm, may be driven by a driving signal with an effective voltage value of 5V which is far below the human safety voltage for user safety consideration. In the present embodiment, a copper foil electrode 2B on the circuit board 2A is used to interconnect the piezoelectric material 2C with the circuit board 2A in a following manner. A conductive material (such as silver conductive epoxy adhesive DC80B) is coated on the copper foil electrode 2B, and the circuit board 2A and the piezoelectric material 2C are adhered together by a thermal curing epoxy resin Loctite3212 (which is an adhesive that can be cured by heating with hot air or in a drying tunnel in a short time). The cured epoxy adhesive has a physical property similar to that of the ceramic material and the circuit board (such as an FR4 epoxy board), thereby improving the vibration coupling efficiency and the connection reliability between the piezoelectric material 2C and the circuit board 2A. The circuit board 2A has a width of 1.2 mm and a length of 15 mm.

The bone conduction receiver in the present disclosure may be applied in a portable electronic device such as a mobile phone, tablet Personal Computer (PC) or MP3 player, especially applied in a portable electronic device having a telephone function to improve call privacy. The present disclosure is further described hereinafter in more detail with reference to the drawings which show a mobile phone according to a specific embodiment.

Figure 3:
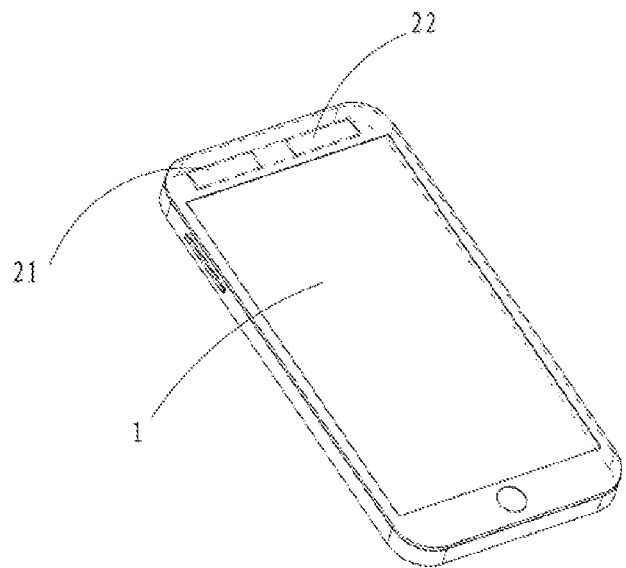
FIG. 3 is a schematic perspective view of a mobile phone according to a specific embodiment of the present disclosure.
Figure 4:
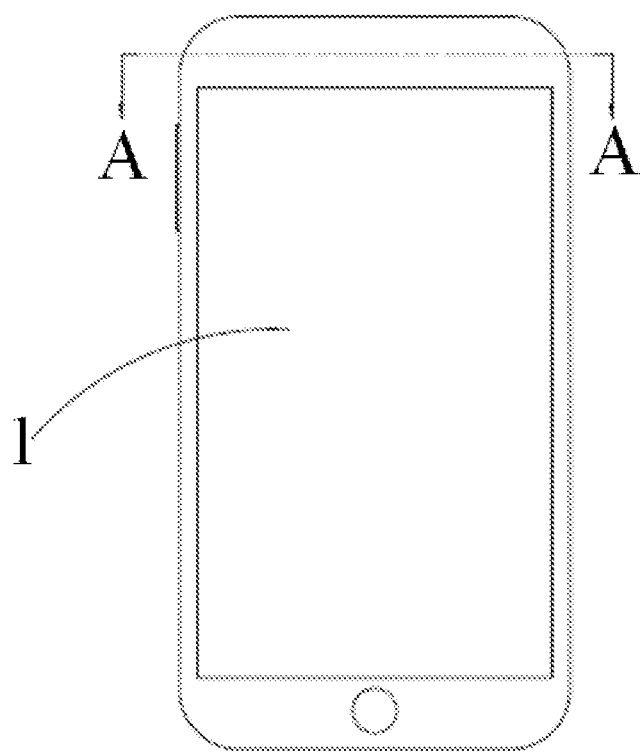
FIG. 4 is a front view of the mobile phone shown in FIG. 3.
Figure 5:
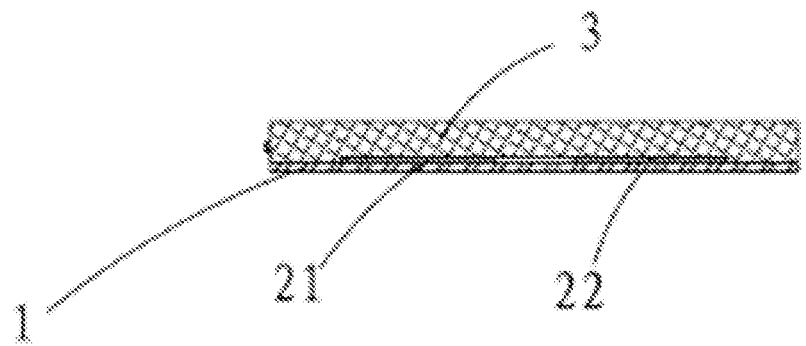
FIG. 5 is a cross sectional view taken along a line A-A in FIG. 4, but viewed from an inverted aspect.

As shown in FIGS. 3 to 5, the first piezoelectric bone conduction receiver driving module 21 and the second piezoelectric bone conduction receiver driving module 22 of the piezoelectric bone conduction receiver in the present embodiment are symmetrically disposed at the top of a main body 3 of the mobile phone and disposed under the bottom surface of a display screen 1 (or a glass protective screen cover) of the mobile phone. The piezoelectric driving and signal processing circuit of the piezoelectric bone conduction receiver is connected with a mainboard of the mobile phone, and is configured to receive an audio signal from the mainboard of the mobile phone and convert the audio signal into a piezoelectric driving signal which is then applied to the first and second piezoelectric bone conduction receiver driving modules 21 and 22 via the driving signal switching module.

Figure 6:
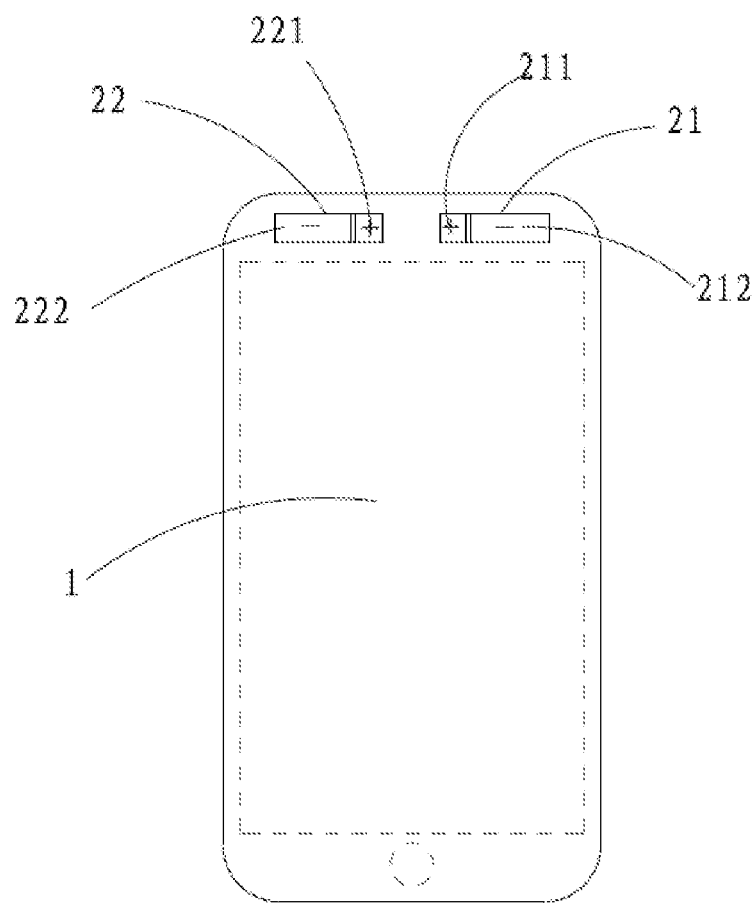
FIG. 6 is a schematic diagram showing signal input terminals of the piezoelectric bone conduction receiver in the mobile phone shown in FIG. 3.

As shown in FIG. 6, the first piezoelectric bone conduction receiver driving module 21 has a positive electrode 211 and a negative electrode 212 as voltage signal input terminals, and the second piezoelectric bone conduction receiver driving module 22 has a positive electrode 221 and a negative electrode 222 as voltage signal input terminals. When the positive electrode 211 is electrically connected with the positive electrode 221 and the negative electrode 212 is electrically connected with the negative electrode 222, the first and second piezoelectric bone conduction receiver driving modules are driven by the driving signals of the same phase; and when the positive electrode 211 is electrically connected with the negative electrode 222 and the negative electrode 212 is electrically connected with the positive electrode 221, the first and second piezoelectric bone conduction receiver driving modules are driven by the driving signals of the opposite phases. A phase relationship between the driving signals can be switched between a first relationship indicating the same phase and a second relationship indicating the opposite phases by the driving signal switching module.

Figure 7:
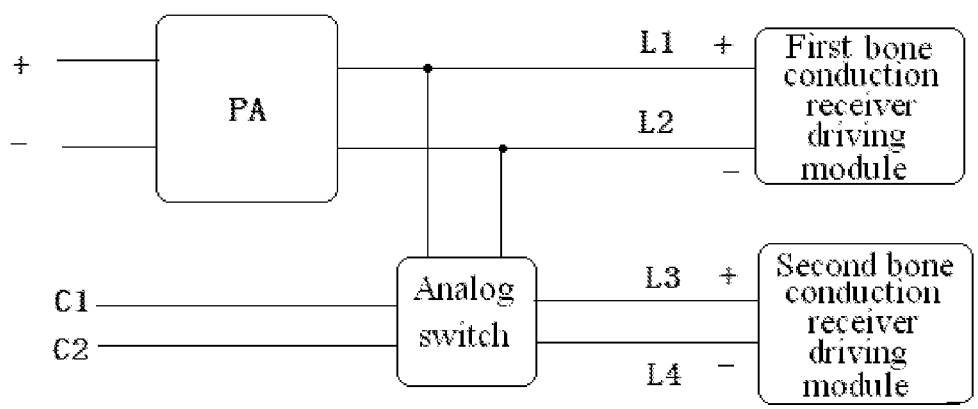
FIG. 7 is a circuit block diagram of a signal switching module according to a specific embodiment of the present disclosure.

As shown in FIG. 7, in some embodiments, the driving signal switching module can be an analog switch with four terminals L1, L2, L3 and L4 thereof being connected with the positive electrode 211 and the negative electrode 212 of the first piezoelectric bone conduction receiver driving module and the positive electrode 221 and the negative electrode 222 of the second piezoelectric bone conduction receiver driving module, respectively. The terminals L1 and L2 are further connected with the positive and negative output terminals of the piezoelectric driving and signal processing circuit PA. A phase relationship between the driving signals applied to the first and second bone conduction receiver driving modules can be switched between the first relationship and the second relationship by adjusting control signals C1, C2 to the analog switch in a manner described as follows.

TABLE 1

| C1 | C2 | Analog switch output |
|----|----|----------------------|
| 0  | 0  | Terminals L1 and L3 being electrically connected; Terminals L2 and L4 being electrically connected |
| 0  | 1  | Terminals L1 and L4 being electrically connected; Terminals L2 and L3 being electrically connected |
| 1  | 0  | Invalid output |
| 1  | 1  | Invalid output |

Different from the related art, the portable electronic device of the present disclosure incorporating the piezoelectric bone conduction receiver can operate in one of a normal voice call mode and a private voice call mode implemented by hardware or implemented by software on a necessary general hardware platform. In the normal voice call mode, the phases of the driving signals applied to the first and second piezoelectric bone conduction receiver driving modules are same to increase volume loudness in a noisy environment; while in the private voice call mode, the phases of the driving signals (which have the same amplitude) applied to the first and second piezoelectric bone conduction receiver driving modules are opposite to improve call privacy in a quiet environment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A piezoelectric bone conduction receiver, comprising:
   a piezoelectric bone conduction receiver driving unit functioning as an acoustic vibration element;
   a piezoelectric driving and signal processing circuit; and
   a driving signal switching module, wherein:
   the piezoelectric bone conduction receiver driving unit comprises at least two piezoelectric bone conduction receiver driving modules,
   the at least two piezoelectric bone conduction receiver driving modules are connected with the driving signal switching module which is further connected with the piezoelectric driving and signal processing circuit, and
   the driving signal switching module controls phases of piezoelectric driving signals outputted by the piezoelectric driving and signal processing circuit to the at least two piezoelectric bone conduction receiver driving modules, so that the at least two piezoelectric bone conduction receiver driving modules are simultaneously driven by the piezoelectric driving signals outputted by the piezoelectric driving and signal processing circuit in same or opposite phases.

2. The piezoelectric bone conduction receiver of claim 1, wherein the driving signal switching module is an analog switch.

3. The piezoelectric bone conduction receiver of claim 2, wherein the piezoelectric bone conduction receiver driving unit comprises a first piezoelectric bone conduction receiver driving module and a second piezoelectric bone conduction receiver driving module driven independently from the first piezoelectric bone conduction receiver driving module, and wherein a positive signal input terminal and a negative signal input terminal of each of the first piezoelectric bone conduction receiver driving module and the second piezoelectric bone conduction receiver driving module are connected with the analog switch, and the analog switch is configured to switch the phases of the piezoelectric driving signals received by the first and second piezoelectric bone conduction receiver driving modules between a first relationship, in which the positive signal input terminal and the negative signal input terminal of the first piezoelectric bone conduction receiver driving module are respectively connected with the positive signal input terminal and the negative signal input terminal of the second piezoelectric bone conduction receiver driving module, and a second relationship, in which the positive signal input terminal and the negative signal input terminal of the first piezoelectric bone conduction receiver driving module are respectively connected with the negative signal input terminal and the positive signal input terminal of the second piezoelectric bone conduction receiver driving module.

4. The piezoelectric bone conduction receiver of claim 1, wherein each of the at least two piezoelectric bone conduction receiver driving modules comprises: a piezoelectric material coated with an upper electrode layer and a lower electrode layer at opposite sides thereof, a circuit board, and a thin or flexible circuit configured to interconnect the upper and lower electrode layers with the circuit board.

5. The piezoelectric bone conduction receiver of claim 4, wherein the piezoelectric material of the piezoelectric bone conduction receiver driving module is selected from a piezoelectric ceramic material or a piezoelectric organic polymer material.

6. The piezoelectric bone conduction receiver of claim 4, wherein the piezoelectric material forms a single-layer structure, a double-layer composite structure or a multi-layer composite structure.

7. The piezoelectric bone conduction receiver of claim 4, wherein the flexible circuit is a silver conductive adhesive, lead wires, a Flexible Printed Circuit or a flexible conductive strip, and a contact resistance of the flexible circuit is less than 50.

8. The piezoelectric bone conduction receiver of claim 2, wherein each of the at least two piezoelectric bone conduction receiver driving modules comprises: a piezoelectric material coated with an upper electrode layer and a lower electrode layer at opposite sides thereof, a circuit board, and a thin or flexible circuit configured to interconnect the upper and lower electrode layers with the circuit board.

9. The piezoelectric bone conduction receiver of claim 3, wherein the at least two piezoelectric bone conduction receiver driving modules each comprises: a piezoelectric material coated with an upper electrode layer and a lower electrode layer at opposite sides thereof, a circuit board, and a thin or flexible circuit configured to interconnect the upper and lower electrode layers with the circuit board.

10. A portable electronic device, comprising:
    a piezoelectric bone conduction receiver, wherein the piezoelectric bone conduction receiver comprises:
    a piezoelectric bone conduction receiver driving unit functioning as an acoustic vibration element;
    a piezoelectric driving and signal processing circuit; and
    a driving signal switching module, wherein:
    the piezoelectric bone conduction receiver driving unit comprises at least two piezoelectric bone conduction receiver driving modules,
    the at least two piezoelectric bone conduction receiver driving modules are connected with the driving signal switching module which is further connected with the piezoelectric driving and signal processing circuit, and
    the driving signal switching module controls phases of piezoelectric driving signals outputted by the piezoelectric driving and signal processing circuit to the at least two piezoelectric bone conduction receiver driving modules, so that the at least two piezoelectric bone conduction receiver driving modules are simultaneously driven by the piezoelectric driving signals outputted by the piezoelectric driving and signal processing circuit in same or opposite phases.

11. The portable electronic device of claim 10, wherein the piezoelectric bone conduction receiver driving modules are disposed under a bottom surface of a display screen or a glass protective screen cover of the portable electronic device.

12. A piezoelectric bone conduction receiver, comprising:
a first piezoelectric bone conduction receiver driving module and a second piezoelectric bone conduction receiver driving module;
a driving signal switching module connected with the first piezoelectric bone conduction receiver driving module and the second piezoelectric bone conduction receiver driving module; and
a piezoelectric driving and signal processing circuit connected with the driving signal switching module and outputting a piezoelectric driving signal, wherein:
in a noisy environment, the driving signal switching module receives the piezoelectric driving signal, and outputs the piezoelectric driving signal of a first phase to both of the first piezoelectric bone conduction receiver driving module and the second piezoelectric bone conduction receiver driving module, so that the first piezoelectric bone conduction receiver driving module and the second piezoelectric bone conduction receiver driving module are simultaneously driven; and
in a quiet environment, the driving signal switching module receives the piezoelectric driving signal, and outputs the piezoelectric driving signal of the first phase to the first piezoelectric bone conduction receiver driving module and outputs the piezoelectric driving signal of a second phase opposite to the first phase to the second piezoelectric bone conduction receiver driving module, so that the first piezoelectric bone conduction receiver driving module and the second piezoelectric bone conduction receiver driving module are simultaneously driven.

13. The piezoelectric bone conduction receiver of claim 12, wherein:
vibrations from the first piezoelectric bone conduction receiver driving module and the second piezoelectric bone conduction receiver driving module are perceived by a user though body bones of the user and a double-path air acoustic coupling, when the driving signal switching module receives the piezoelectric driving signal, and outputs the piezoelectric driving signal of the first phase to both of the first piezoelectric bone conduction receiver driving module and the second piezoelectric bone conduction receiver driving module; and
vibrations from the first piezoelectric bone conduction receiver driving module and the second piezoelectric bone conduction receiver driving module are perceived by the user through body bones of the user, when the driving signal switching module receives the piezoelectric driving signal, and outputs the piezoelectric driving signal of the first phase to the first piezoelectric bone conduction receiver driving module and outputs the piezoelectric driving signal of a second phase opposite to the first phase to the second piezoelectric bone conduction receiver driving module.

14. The portable electronic device of claim 10, wherein the piezoelectric driving and signal processing circuit receives an audio signal from a mainboard of the portable electronic device and converts the audio signal into the piezoelectric driving signal.

\* \* \* \* \*